United States Patent [19]

Sromin et al.

[11] Patent Number: 5,910,697
[45] Date of Patent: Jun. 8, 1999

[54] HIGH-POWER, LOW-VOLTAGE AXIAL AIR-GAP ELECTRICAL MACHINE HAVING A COMPACT STATOR

[75] Inventors: Alexander Sromin, Ashdod; Moshe Hiterer, Jerusalem, both of Israel

[73] Assignee: Samon Engineering Ltd., Nes Ziona, Iceland

[21] Appl. No.: 08/785,226

[22] Filed: Jan. 17, 1997

[51] Int. Cl.⁶ .................................. H02K 3/00; H02K 3/28
[52] U.S. Cl. .......................... 310/254; 310/268; 310/208; 310/194; 310/179
[58] Field of Search ...................... 310/268, 266, 310/208, 179, 194, 254, 217, 215

[56] References Cited

U.S. PATENT DOCUMENTS

| Re. 31,278 | 6/1983 | Schmider | 310/268 |
|---|---|---|---|
| 490,280 | 1/1893 | Hansen | 310/268 |
| 2,557,249 | 6/1951 | Aske | 171/252 |
| 3,953,751 | 4/1976 | Merkle et al. | 310/91 |
| 4,007,390 | 2/1977 | Muller et al. | 310/90 |
| 4,011,475 | 3/1977 | Schmider | 310/68 R |
| 4,577,130 | 3/1986 | Reed | 310/194 |
| 4,603,271 | 7/1986 | Maruyama et al. | 310/62 |
| 4,629,920 | 12/1986 | Hermann | 310/156 |
| 4,629,948 | 12/1986 | Tassinario | 318/254 |
| 4,743,813 | 5/1988 | Tassinario | 318/134 |
| 4,835,840 | 6/1989 | Stokes | 29/598 |
| 4,973,873 | 11/1990 | Wurth | 310/254 |
| 4,996,457 | 2/1991 | Hawsey et al. | 310/114 |
| 5,117,141 | 5/1992 | Hawsey et al. | 210/114 |
| 5,334,898 | 8/1994 | Skybyk | 310/268 |
| 5,361,010 | 11/1994 | Muller | 310/156 |

FOREIGN PATENT DOCUMENTS

| 609184 | 5/1978 | U.S.S.R. | 310/268 |
|---|---|---|---|

*Primary Examiner*—Nestor Ramirez
*Assistant Examiner*—Karl I. E. Tamai
*Attorney, Agent, or Firm*—Mark M. Friedman

[57] ABSTRACT

An axial air-gap electric machine comprises a stator including a supporting member having one or more coil structures mounted thereon. The supporting member includes one or more eccentric recesses to accommodate portions of the coil structures, allowing the machine to be constructed more compactly. One important application of the invention is to high-power, low-voltage motors and generators, to accommodate the thick wires leading to the coil windings.

9 Claims, 7 Drawing Sheets

HIGH-POWER, LOW-VOLTAGE AXIAL AIR-GAP ELECTRICAL MACHINE HAVING A COMPACT STATOR

FIELD AND BACKGROUND OF THE INVENTION

The present invention relates to axial air-gap electric machines, such as motors and generators, and, more particularly, to an electric motor or generator whose stator is adapted for high-power applications and low-voltage applications.

Electric drive systems have several advantages as propulsion systems for a wide variety of vehicles, ranging from light, one passenger vehicles, such as bicycles, to heavy tracked vehicles, such as military tanks. One is that an electric transmission system can be configured spatially with more flexibility than a mechanical system, leaving more room within the vehicle for its other systems. Another is that regenerative braking is easily implemented, using the motors as generators.

The Proceedings of the Thirteenth International Electric Vehicle Symposium (Japan, 1996) includes descriptions of many such vehicles. For example, Gary Starr and Rick Rocklewitz ("Electricycles for Zero Air Pollution & Fun") describe a 12 volt DC motor, having a total power of 400 watts and a peak current of 100 amps, for retrofitting to bicycles. At the other extreme of land vehicle size, an article entitled "Coilgun Research Spawns Mighty Motors and More", in the Sep. 24, 1993 issue of Machine Design, reports a 430 horsepower electric drive for military tanks, based on brushless DC motors.

One such tank motor, reported, by R. M. Ogorkiewicz, in an article entitled "Electric Tank Treads With More Torque, Less Noise", in Jane's International Defense Review 2/1966, consists of three or more units in tandem. Each unit has a rotor with permanent magnets around its circumference, rigidly attached to a common shaft, and rotating between two stators. The stators, mounted on the lateral walls of the units, included coils wound parallel to the walls on yokes attached to the walls and located at about the same radius from the shaft as the magnets. Space is at a premium in this application, and can be conserved in this motor by configuring it as a single unit instead of three separate units, by joining adjacent lateral walls and yokes to produce stators that consist of coils mounted on both sides of a central supporting member and that are sandwiched between pairs of rotors. This in and of itself is not new. Lee et al., in U.S. Pat. No. 5,146,144, disclose a motor operable in two different speed/torque regimes and including a stator comprising a central supporting member with coils on either side. Kaszman, in U.S. Pat. No. 4,761,590, teaches a reluctance motor having a stator sandwiched between two rotors and supported by special brackets. Further compression of the motor is possible, however, and is the subject of the present invention.

SUMMARY OF THE INVENTION

According to the present invention there is provided an axial air-gap electric machine having a rotational axis, comprising: (a) a generally planar stator, concentric with the rotational axis, including: (i) a supporting member having an eccentric recess, and (ii) a first coil structure including an exposed portion and a concealed portion, the concealed portion at least partially occupying the recess.

The eccentric recess of the present invention need not extend all the way through the supporting member. However, a supporting member having recesses that extend all the way through the supporting member, from one axial side to the other, thereby constituting apertures through the supporting member, is easier to fabricate than a supporting member having recesses that do not penetrate the supporting member. In all of the illustrative examples herein, the recesses are apertures.

In electric motors for high-power, low-voltage applications, such as drive motors for heavy vehicles, the wires in the coils are substantially thicker (up to several millimeters) than in the low-power applications of, for example, the Lee et al. patent cited above. In particular, to conserve space, special provision must be made for the leads connecting the coil windings to external circuitry. In the embodiment of the present invention that is described below in more detail with reference to FIG. 1, the coil windings are mounted outside of and parallel to the supporting member, and the leads are accommodated by the apertures of the supporting member. Equivalently, the coil windings, which are easily visible from outside the stator, may be described as being the exposed portion of the coil structures of this embodiment, and the leads, which are not easily visible from outside the stator, may be described as being the concealed portion of the coil structures of this embodiment. Generally, the exposed portion of a coil structure of the present invention is defined herein to be the portion of the coil structure that is outside of the recesses of the supporting member, and the concealed portion of the coil structure is defined herein to be the portion of the coil structure that lies within the recesses.

The scope of the present invention includes stators generally that comprise a central supporting member to which are attached one or more coil structures that are accommodated by one or more eccentric recesses in the supporting member. More examples of such stators are given below. Furthermore, it will be appreciated that the principles of the present invention are applicable to electric machines generally, not just to motors.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an axial air-gap electric machine including an improved stator. Specifically, a motor of the present invention intended for high-power and low-voltage applications is more compact than those presently known.

The principles and operation of a rotary electric machine according to the present invention may be better understood with reference to the drawings and the accompanying description.

Figure 1:
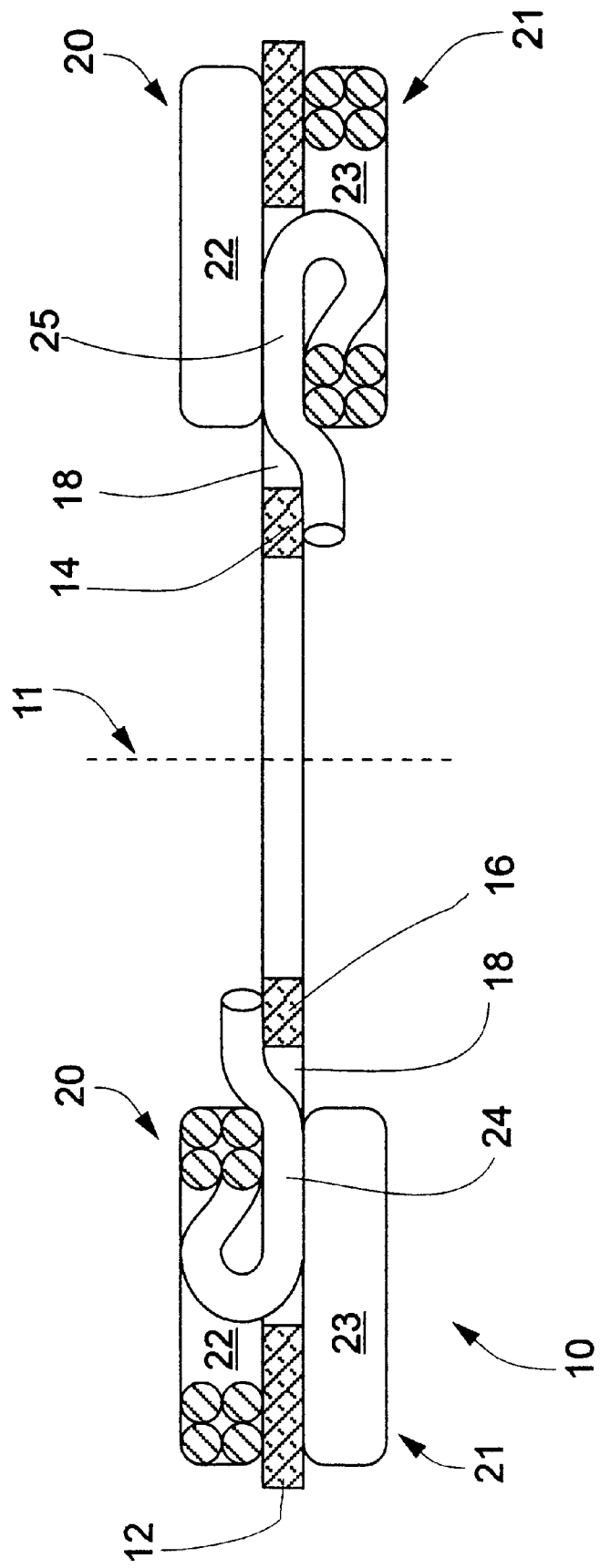
FIG. 1 is a cross-sectional view of a stator according to the present invention.

Referring now to the drawings, FIG. 1 shows an axial cross-sectional view of a stator 10 according to the present invention. Dashed line 11 represents the rotational axis of the rotary electrical machine wherein stator 10 is mounted; this axis is also an axis of symmetry of stator 10. Mounted circumferentially on first axial side 14 of a supporting member 12 is a first coil structure 20 that includes several windings 22 of the thick wire needed for this application. Mounted similarly on a second axial side 16 of supporting member 12 is a second coil structure 21 that includes several similar windings 23. Each winding 22 or 23 is wound substantially parallel to the side 14 or 16 on which the corresponding coil structure 20 or 21 is mounted. Extensions 24 and 25 of the wires of windings 22 and 23 lead to external circuitry. Slot-shaped eccentric apertures 18 are provided in supporting member 12 to accommodate extensions 24 and 25. Note that windings 23 on second side 16 are staggered relative to windings 22 on first side 14, so that all extensions 24 and 25 may be accommodated.

Figure 2:
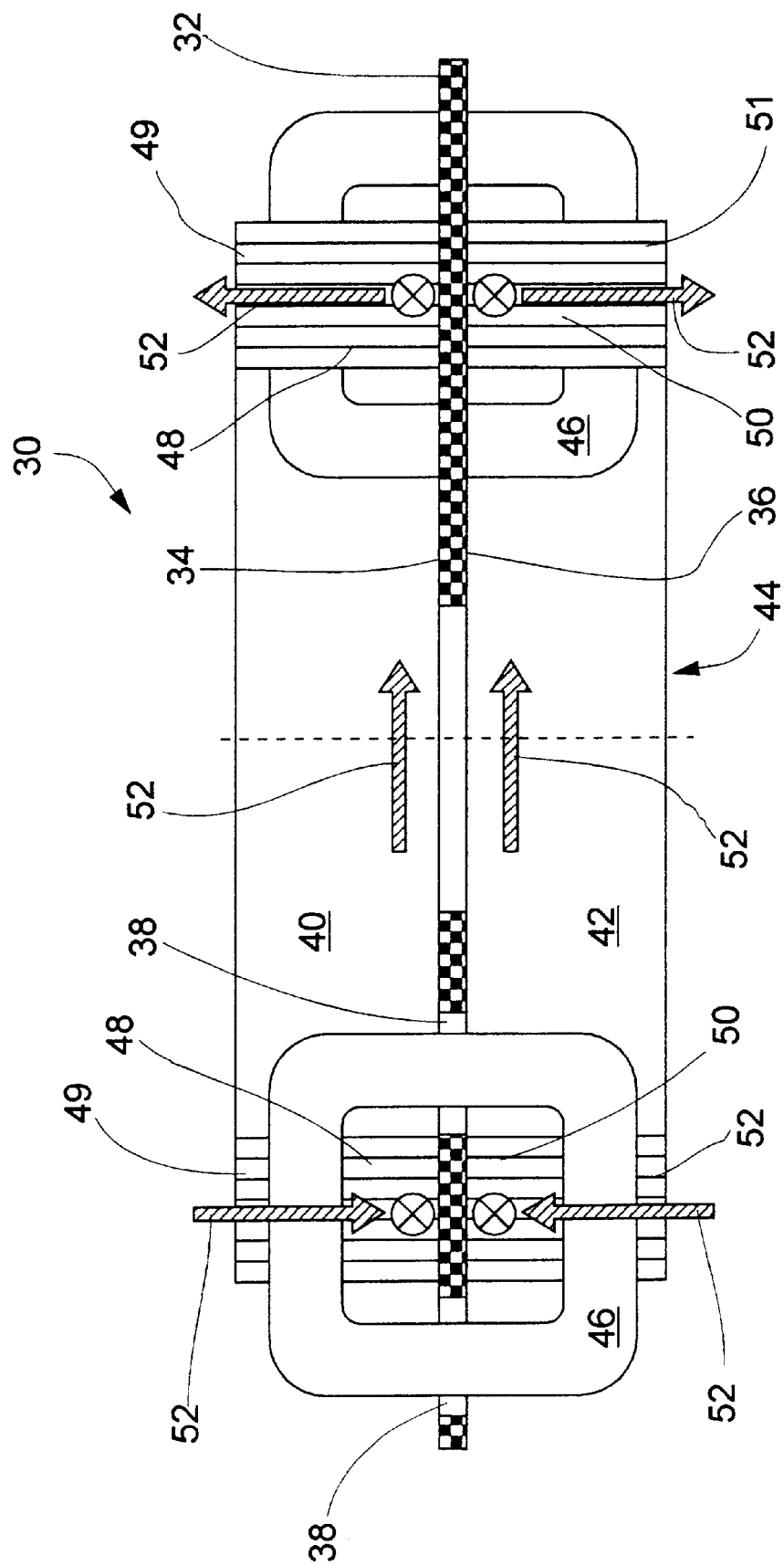
FIG. 2 is a cross-sectional view of a second embodiment of a stator according to the present invention.

FIG. 2 shows an axial cross-sectional view of a stator 30 intended for use in a magnetically separated rotary electric machine. A single coil structure 44 includes a first annular core 40 mounted on a first axial side 34 of a supporting member 32, a second annular core 42 mounted on a second axial side 36 of supporting member 32, and several windings 46, mounted circumferentially around supporting member 32. Cores 40 and 42 are made of a soft ferromagnetic material such as iron, and include, respectively, yoke portions 41 and 50 and tooth portions 49 and 51. Windings 46 are wound as shown in substantially radial slots in cores 40 and 42 and through apertures 38. For example, winding 46 on the left hand side of FIG. 2 is wound substantially parallel to the plane of FIG. 2, so that the portions of windings 46 that are axially beyond yoke portions 48 and 50, relative to supporting member 32, are substantially parallel to sides 34 and 36, respectively; while the portions of windings 46 that extend through apertures 38 are substantially perpendicular to sides 34 and 36. In this case, the exposed portion of coil structure 44 includes cores 40 and 42, as well as the portions of windings 46 that are outside of apertures 38, whereas the concealed portions of coil structures 44 include the portions of windings 46 that are within apertures 38. Arrows 52 show the direction of magnetic flux within stator 20 when stator 20 is in use within a magnetically separated rotary electric machine.

Figure 3:
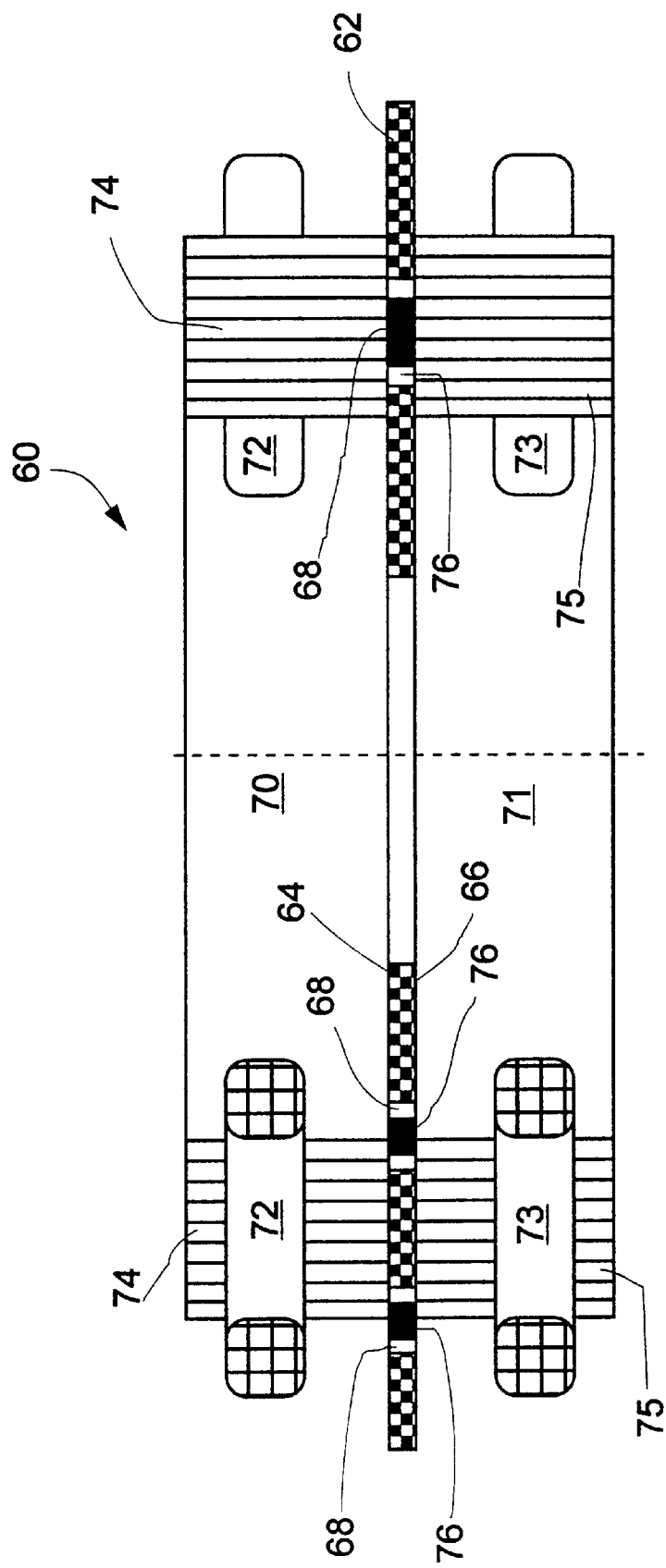
FIG. 3 is a cross-sectional view of a third embodiment of a stator according to the present invention.

FIG. 3 shows an axial cross-sectional view of a third embodiment of a stator 60 according to the present invention. Mounted on each of axial sides 64 and 66 of a supporting member 62 are two coil structures: coil structure 70 on axial side 64, and coil structure 71 on axial side 66. Coil structure 70 includes a soft ferromagnetic annular core 74, with several windings 72, wound substantially parallel to side 64, circumferentially around core 74, and via substantially radial slots in core 74. Similarly, coil structure 71 includes a soft ferromagnetic annular core 75, with several windings 73, wound substantially parallel to side 66, circumferentially around core 75, and via substantially radial slots in core 75. Cores 74 and 75 are attached to each other via eccentric apertures 68 in supporting member 62 using a suitable adhesive 76. Other attachment methods, such as welding and brazing, may also be used. In this case, the exposed portions of coil structures 70 and 71 include windings 72 and 73, and cores 74 and 75, whereas the concealed portions of coil structures 70 and 71 include adhesive 76.

Figure 4A:
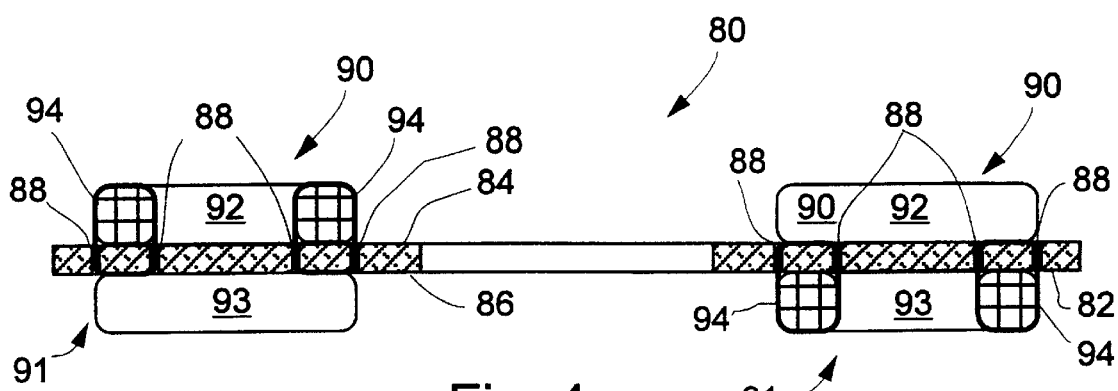
FIG. 4A is a cross-sectional view of one variant of a fourth embodiment of a stator according to the present invention.
Figure 4B:
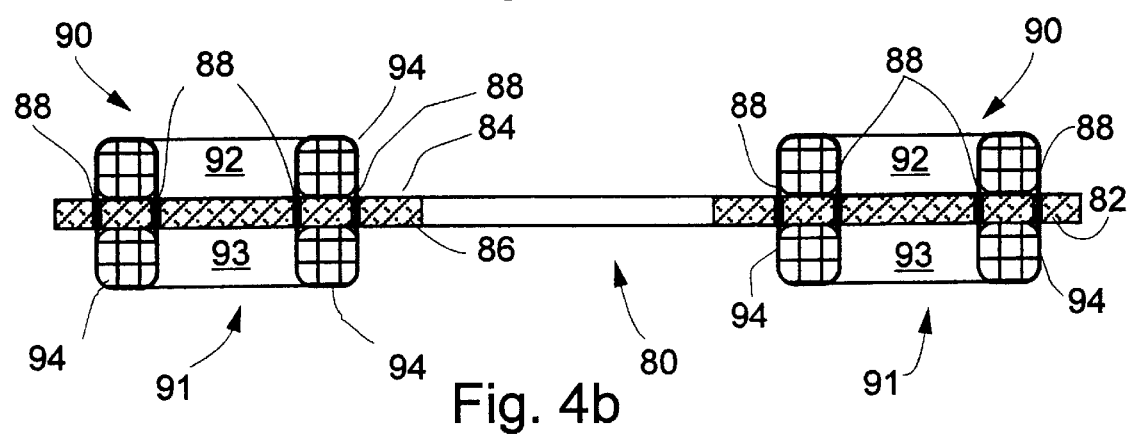
FIG. 4B is a cross-sectional view of another variant of the fourth embodiment of a stator according to the present invention.

FIGS. 4A and 4B show axial cross-sectional views of two variants of a fourth embodiment of a stator 80 according to the present invention. Mounted on each of axial sides 84 and 86 of a supporting member 82 are two coil structures: coil structure 90 on axial side 84 and coil structure 91 on axial side 86. Coil structure 90 includes several winding 92, mounted circumferentially around side 84 and wound substantially parallel to side 84. Similarly, coil structure 91 includes several winding 93, mounted circumferentially around side 86 and wound substantially parallel to side 86. In FIG. 4A, windings 92 and 93 are staggered with respect to each other, and each winding 92 or 93 is attached to support structure 82 using, as fasteners, thin flexible elements 94, such as suitable threads or wires, running through apertures 88 as shown. In FIG. 4B, windings 92 and 93 are opposite each other, and are attached to each other using elements 94 as shown. In this case, the exposed portions of coil structures 90 include windings 92 and 93, as well as the portions of elements 94 that are outside apertures 88, whereas the concealed portions of coil structures 90 include the portions of elements 94 that are within apertures 88.

Figure 5:
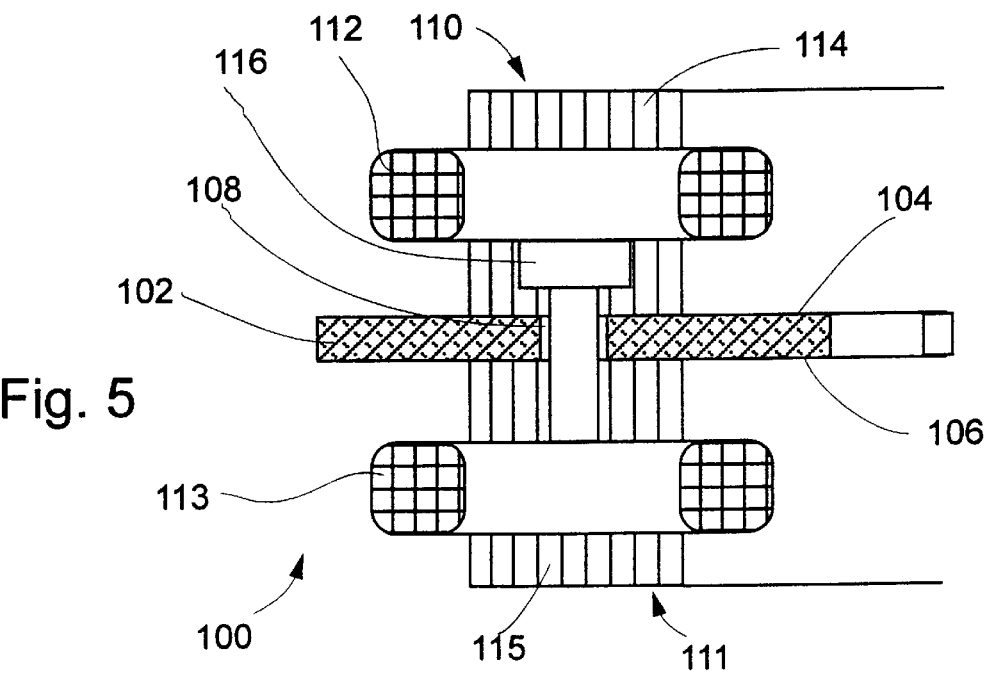
FIG. 5 is a partial cross-sectional view of a fifth embodiment of a stator according to the present invention.

FIG. 5 shows an axial cross sectional view of one-half of a fifth embodiment of a stator 100 according to the present invention. Mounted on each of axial sides 104 and 106 of a supporting member 102 are two coil structures: coil structure 110 on axial side 104 and coil structure 111 on axial side 106. Coil structure 110 includes a soft ferromagnetic annular core 114, with several windings 112, only one of which is shown in FIG. 5, wound substantially parallel to side 104, circumferentially around core 114, and via substantially radial slots in core 114. Similarly, coil structure 111 includes a soft ferromagnetic annular core 115, with several windings 113, only one of which is shown in FIG. 5, wound substantially parallel to side 106, circumferentially around core 115, and via substantially radial slots in core 115. Cores 114 and 116 are attached to each other via eccentric apertures 108 in supporting member 102 using suitable fasteners 116 such as bolts. In this case, the exposed portions of coil structures 110 and 111 include windings 112 and 113, as well as cores 114 and 115, whereas the concealed portions of coil structures 110 and 111 include fasteners 116.

Figure 6:
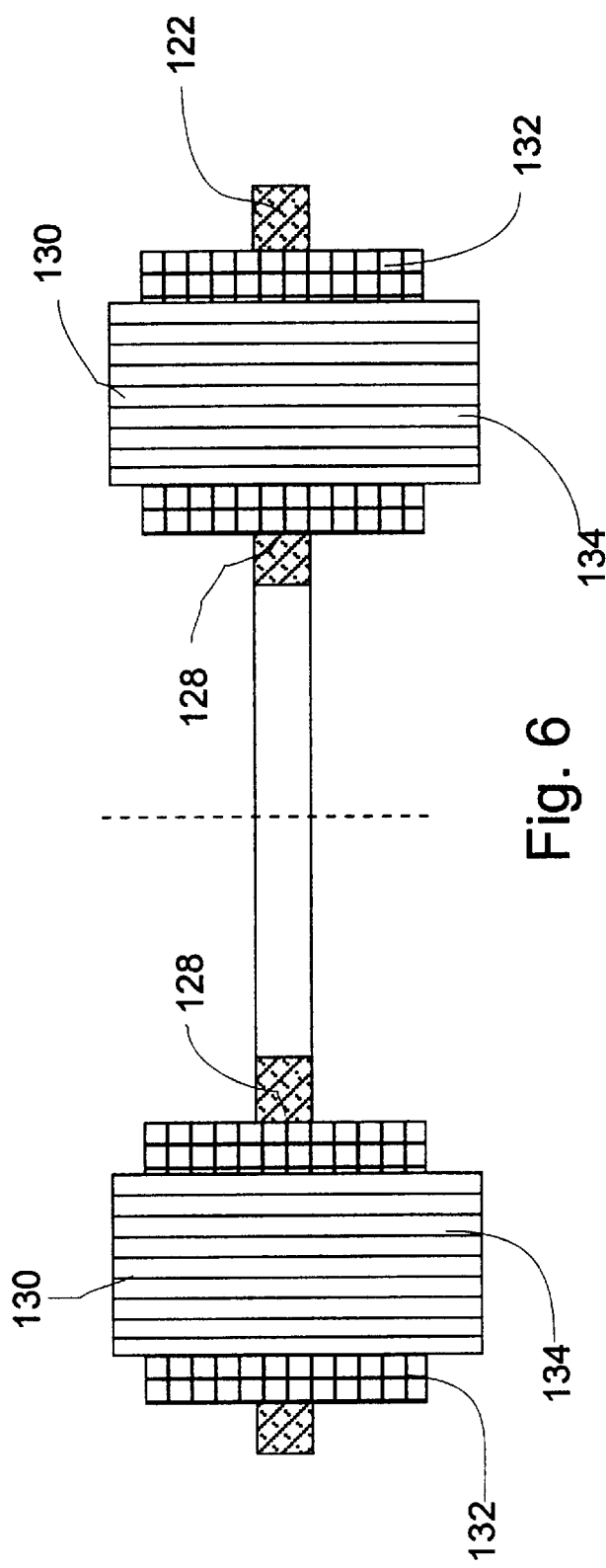
FIG. 6 is a cross-sectional view of a sixth embodiment of a stator according to the present invention.

FIG. 6 shows an axial cross-sectional view of a sixth embodiment of a stator according to the present invention. Mounted circumferentially and within eccentric apertures 128 of a supporting member 122 is a coil structure 130 that includes several windings 132, wound substantially parallel to the plane of supporting member 122 around soft ferromagnetic cores 134. In this case, the exposed portion of coil structure 130 includes the portions of windings 132 and cores 134 that are outside of apertures 128, whereas the concealed portion of coil structure 130 includes the portions of windings 132 and cores 134 that are within apertures 128.

Figure 7:
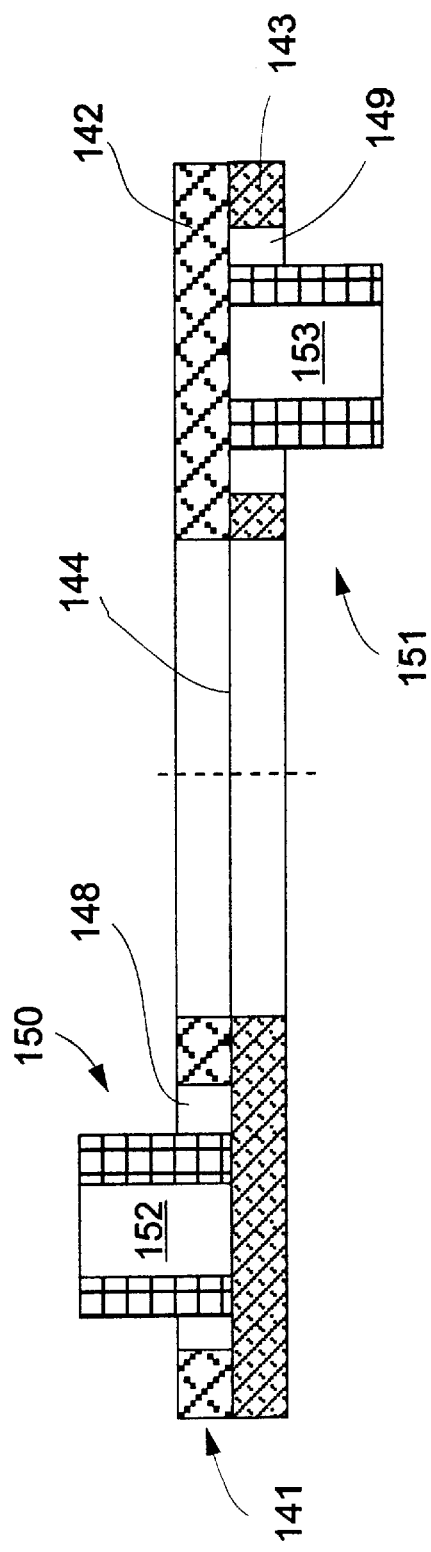
FIG. 7 is a cross-sectional view of a seventh embodiment of a stator according to the present invention.

FIG. 7 shows an axial cross sectional view of a seventh embodiment of a stator according to the present invention. Supporting member 141 of this embodiment consists of two planar members 142 and 143. Each of planar members 142 and 143 is substantially identical to supporting member 122 of the embodiment of FIG. 6: a substantially circular disk having eccentric apertures therethrough. The apertures of planar member 142 are designated by reference numeral 148; the apertures of planar member 143 are designated by reference numeral 149. Planar members 142 and 143 are joined along an interface 144, with apertures 148 staggered with respect to apertures 149. Within apertures 148 are mounted the windings 152 of a first coil to structure 150. Within apertures 149 are mounted the windings 153 of a second coil structure 151. Windings 152 and 153 are wound substantially parallel to interface 144. In this embodiment, the exposed portions of coil structures 150 and 151 include the portions of windings 152 and 153 that are outside of apertures 148 and 149, respectively; and the concealed portions of coil structures 150 and 151 include the portions of windings 152 and 153 that are within apertures 148 and 149, respectively.

Figure 8:
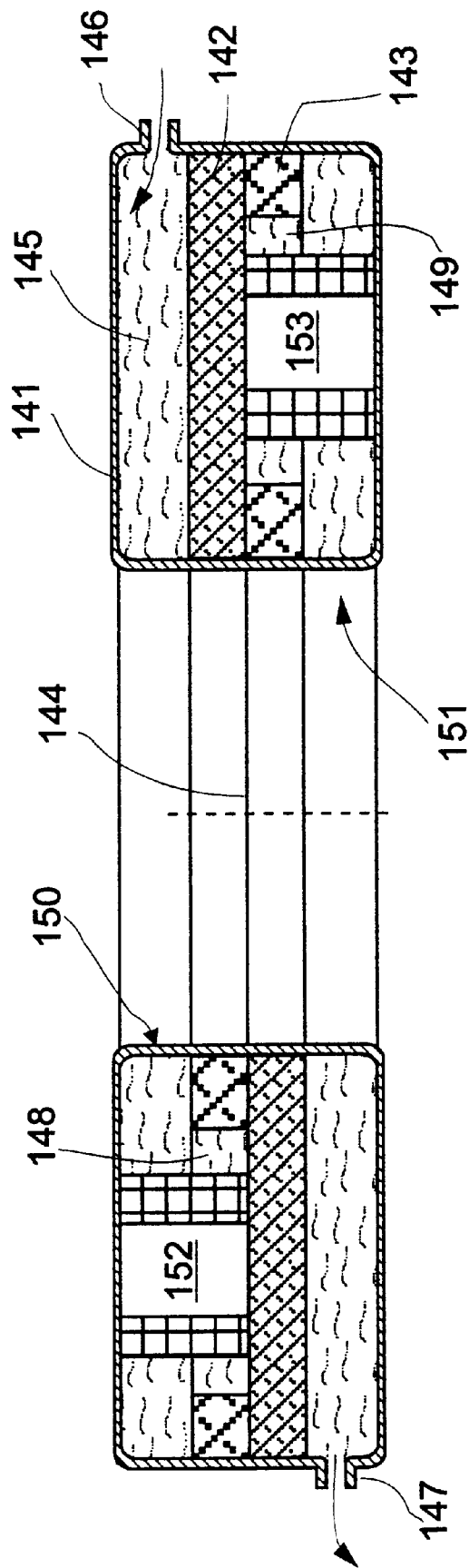
FIG. 8 is a cross-sectional view of the stator of FIG. 7 enclosed in a jacket for liquid cooling.

FIG. 8 shows an axial cross sectional view of the stator of FIG. 7 enclosed in a hollow annular jacket 141 for liquid cooling. A cooling liquid 145, such as water, is introduced to jacket 141 via an inlet port 146 and is removed from jacket 141 via an outlet port 147.

Figure 9:
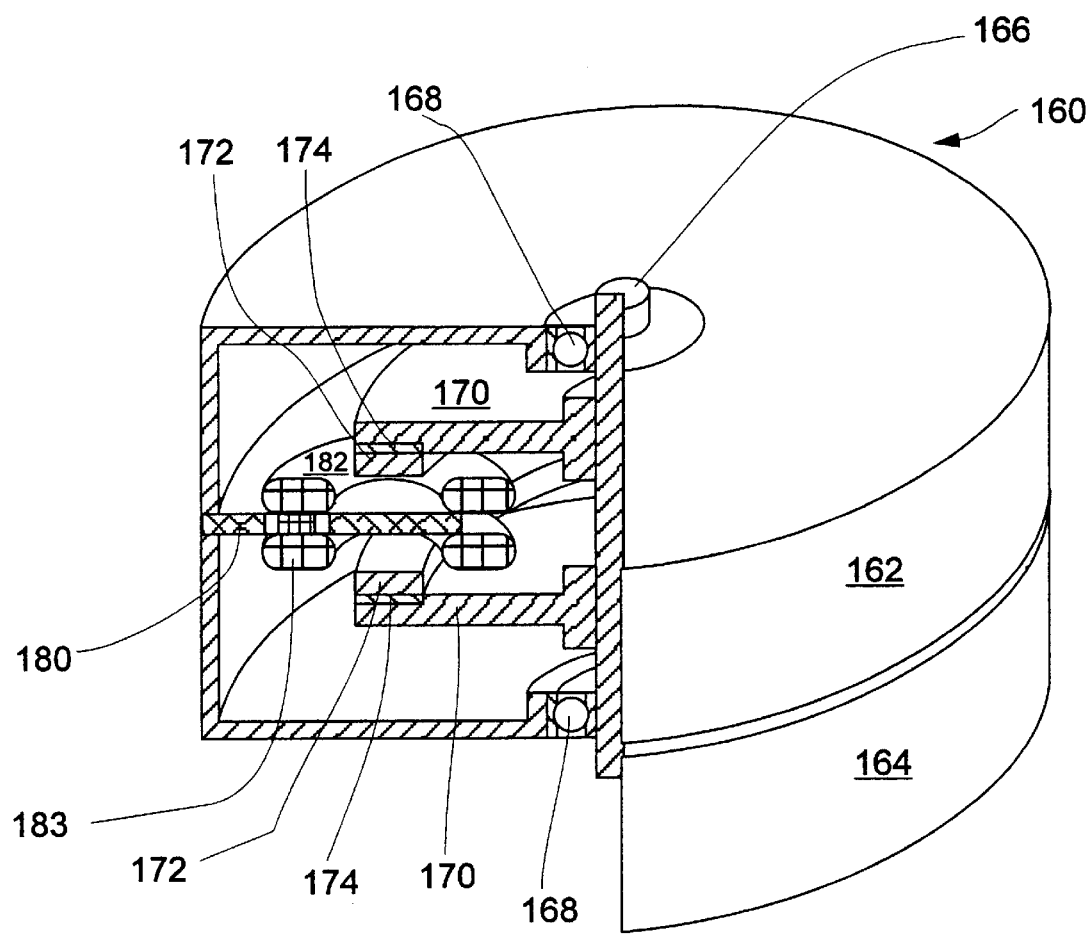
FIG. 9 is a cut-away perspective drawing of a motor according to the present invention.

FIG. 9 is a cut-away perspective view of one embodiment of an axial air-gap electric machine according to the present invention: a double rotor, single stator coreless brushless disc motor 160. A first portion 162 and a second portion 164 of a housing hold between them a stator 180 configured with circumferentially mounted coil structures 182 and 183 in the manner of FIG. 3. A shaft 166 is mounted on bearings 168 so as to be free to rotate about the longitudinal axis thereof. Rigidly attached to shaft 166 are two rotors 170, one rotor 170 on either axial side of stator 180. Each rotor 170 includes a layer 172 of permanent magnets mounted circumferentially thereupon. Because motor 160 is of a magnetically connected design, each rotor 170 also includes yoke members 174.

It will be appreciated that stator 180 may be fixed mechanically between housing portions 142 and 144 by many methods. For example, stator 180 may be held in place by bolts or screws running axially through the outer walls of housing portions 142 and 144. Finally, it will be appreciated that an electric machine built according to the principles of the present invention may have several rotors and stators, with the stators sandwiched in-between the rotors.

While the invention has been described with respect to a limited number of embodiments, it will be appreciated that many variations, modifications and other applications of the invention may be made.

What we claim is:

1. An axial air-gap electric machine having a rotational axis, comprising:
   (a) a generally planar stator, concentric with the rotational axis including:
       (i) a flat supporting member having a first axial side and a first eccentric recess, and
       (ii) a first coil structure, including a majority exposed portion on said first axial side and a minority concealed portion, said exposed and concealed portions including wire at least about as thick as said supporting member, said concealed portion at least partially occupying said first recess, said exposed portion overlying said concealed portion a majority of said wire of said exposed and concealed portions being substantially parallel to said supporting member.

2. The electric machine of claim 1, further comprising:
   (b) a jacket, substantially enclosing said stator, wherethrough a cooling liquid is caused to flow.

3. The electric machine of claim 1, further comprising:
   (b) a first generally planar rotor, concentric with the rotational axis and adapted to be rotated about the rotational axis, and positioned relative to said stator so that at least part of said exposed portion of said first coil structure is between said rotor and said supporting member.

4. The electric machine of claim 3, further comprising:
   (c) a second generally planar rotor, concentric with the rotational axis and adapted to be rotated about the rotational axis, and positioned relative to said stator so that said stator is axially between said first rotor and said second rotor.

5. The electric machine of claim 1, further comprising:
   (b) a housing having a first portion and a second portion, said supporting member intervening axially between said first portion of said housing and said second portion of said housing.

6. The electric machine of claim 1, wherein said supporting member includes a second eccentric recess.

7. The electric machine of claim 6, wherein said supporting member includes two axially adjacent flat members, each of said flat members including at least one aperture, said at least one aperture of a first of said two flat members being staggered relative to said at least one aperture of a second of said two flat members, so that one of said at least one aperture of said first flat member defines said first recess and one of said at least one aperture of said second flat member defines said second recess.

8. The electric machine of claim 6, wherein said supporting member includes a second axial side, and wherein said stator further includes:
   (iii) a second coil structure including a majority exposed portion on said second axial side and a minority concealed portion, said exposed and concealed portions of said second coil structure including wire at least about as thick as said supporting member, said concealed portion of said second coil structure at least partially occupying said second recess, said exposed portion of said second coil structure overlying said concealed portion of said second coil structure, a majority of said wire of said exposed and concealed portions of said second coil structure being substantially parallel to said supporting member.

9. The electric machine of claim 1, wherein said exposed portion includes a winding and wherein said concealed portion includes an extension of said winding.

* * * * *